March 19, 1968     C. B. EATINGER     3,373,835

MOTOR VEHICLE DOOR LOCK

Filed July 29, 1966     2 Sheets-Sheet 1

INVENTOR
CLOYDE B. EATINGER, DECEASED
BY ALBERT HABHAB, ADMINISTRATOR
BY
Lowell & Henderson
ATTORNEYS March 19, 1968  C. B. EATINGER  3,373,835
MOTOR VEHICLE DOOR LOCK
Filed July 29, 1966  2 Sheets-Sheet 2

INVENTOR
CLOYDE B. EATINGER, DECEASED
BY ALBERT HABHAB, ADMINISTRATOR
BY
Lowell & Henderson
ATTORNEYS United States Patent Office 3,373,835
Patented Mar. 19, 1968

3,373,835
MOTOR VEHICLE DOOR LOCK
Cloyde B. Eatinger, deceased, late of Fort Dodge, Iowa, by Albert Habhab, administrator, Snell Bldg., Fort Dodge, Iowa 50501
Substituted for abandoned application Ser. No. 193,051, Apr. 30, 1962. This application July 29, 1966, Ser. No. 580,556
1 Claim. (Cl. 180—113)

ABSTRACT OF THE DISCLOSURE

The invention relates to an attachment for a conventional latch for a vehicle door utilizing a source of suction described as the diaphragm assembly of a fuel pump for rendering the usual releasing and locking means of the latch ineffective at all times when the engine is running and, if desired, when the engine is not running. A pivoted locking lug is piston operated by the vacuum line. The vacuum line is controlled by a three way valve having three positions; namely, a first position where atmospheric pressure is applied to the piston, a second position where the atmospheric pressure is sealed off and vacuum is applied to the piston, and a third position where the atmospheric pressure is sealed off and where vacuum is trapped between the piston and valve thus holding the locking lug in locked position.

---

This invention is a substitute of my copending application 193,051 filed Apr. 30, 1962, which was a continuation of my copending application 804,193 filed Apr. 6, 1959 which was a continuation-in-part of my previous application entitled "Power Operated Locking Mechanism for Vehicle Door Latch Assemblies," Serial No. 461,275, filed Oct. 8, 1954, and now abandoned.

The present invention relates to latch mechanisms for swinging doors and is directed particularly to an improved locking mechanism for the latch of a vehicle door.

An object of the present invention is to provide an attachment for the conventional latch of a vehicle and utilizing a source of suction therefrom which is capable of rendering the releasing and safety means of the latch ineffective in a positive manner irrespective of engine speed.

Another object of the present invention is to provide a remotely controlled locking mechanism for a vehicle door latch of the type having one or more releasing mechanisms and a safety mechanism, the locking mechanism capable of rendering the releasing mechanisms ineffective irrespective of the operation of the safety mechanism.

A further object of the present invention is to provide a remotely controlled member adapted for attachment to the latch case for positively blocking the movement of a pawl member out of a bolt engaged position, whereby to render ineffective the usual releasing means.

Yet another object of the present invention is to provide an attachment of the latch of each door of an automobile, whereby the operation of a single control remote from the latches, all the doors will be simultaneously locked against being opened from the outside and/or from the inside.

Another object of the present invention is to provide a simple attachment for a vehicle door latch, whereby a single control, the door latch can be maintained in a locked condition with the usual releasing and safety mechanisms rendered ineffective, before and after the vehicle engine has stopped running.

A further object of this invention is to provide an attachment for a vehicle door latch which is operable off a source of suction at the fuel pump diaphragm assembly to render ineffective the releasing and safety mechanisms of the latch.

Yet another object of this invention is to provide an attachment of the type and for the purposes hereinbefore enumerated, which is of a structure adapted to be confined entirely within the overall dimensions of the conventional latch mechanism, and whereby no changes or modifications to the latch mechanism are necessary for the securement thereto of the attachment.

Another object of the present invention is to provide an attachment of the type and for the purpose hereinbefore enumerated, which in conjunction with a plurality of other like attachments is concurrently operated by a single remote control member.

A further object of this invention is to provide an attachment for a vehicle door latch which is operable off a source of suction from the vehicle engine, and which includes a remotely located valve for the operator, whereby the operator may manipulate the valve to sequentially: operate the attachment so that it does not affect the door latch; operate the attachment so that it renders the door latch ineffective to open the door while the engine is running; and operate the attachment so that it renders the door latch ineffective to open the door after the engine has stopped running.

Yet a further object of the present invention is to provide an improved remotely controlled mechanism for rendering ineffective the releasing mechanisms of a vehicle door latch, and which is simple in construction, economical in manufacture, and efficient in operation.

These objects, and other features and advantages of the present invention will become readily apparent by reference to the following description and the accompanying drawings, wherein.

Figure 1:
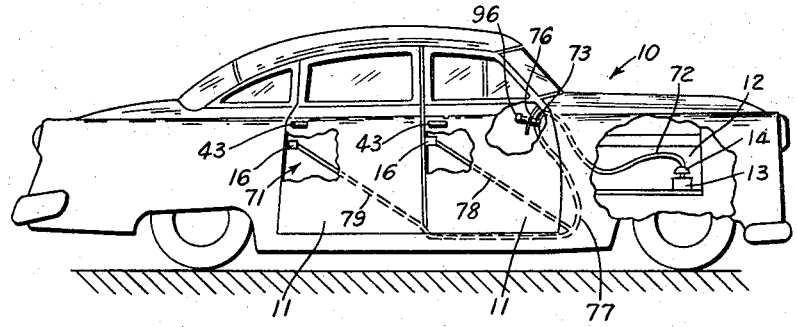
FIG. 1 is a side elevational view of an automobile to which the invention is applied, with certain parts broken away for the purpose of clarity.

Referring to FIG. 1, an automobile 10 is shown as having doors 11, and engine 12, and a fuel pump 13. A diaphragm assembly 14 is provided for the fuel pump 13 to increase the vacuum output of the engine 12. It is well known that the diaphragm assembly 14, usually connected with the carburetor or the intake manifold, is a source of power sufficient to furnish a steady amount of suction substantially unaffected by the throttle of the engine 12.

Figure 8:
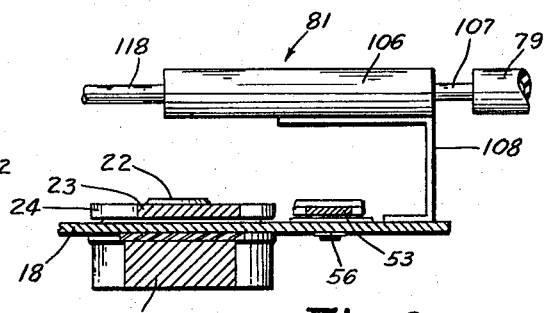
FIG. 8 is a cross-sectional view taken along the line 8—8 in FIG. 2.

Each door 11 is of a usual construction and includes a latch 16 with which this invention is primarily concerned. The latch 16 is adapted to respond to the usual locking and releasing mechanisms provided therefor. In the embodiment of the invention, the latch 16 (FIG. 2) comprises a case 17 having a base 18 and a side 19 (FIG. 5) extended substantially at a right angle to the base 18. A rotatable bolt unit 21 includes a shaft 22 (FIG. 2) secured to and extended through the base 18 and on which is mounted a cog wheel or star gear 23 with teeth 24 arranged on one side of the base 18. On the other side of the base, a star gear 26 (FIG. 8) is mounted on the shaft 22 for engaging the usual striker plate (not shown) carried on the automobile frame, so as to close and hold the door 11 closed.

A flat L-shaped pawl 27 (FIG. 2) and a relative straight first retracting or releasing member 28, superimposed over the pawl member 27, are rotatably secured for relative movement therebetween to the base 18 by a pivot pin 29. The pawl 27 includes a leg 31 which extends across the base 18 and through a slot 32 (FIG. 5) formed therefor in the side 19, the ends of the slot 32 limiting the arcuate movement of the leg 31 and thus the pawl 27. The other leg 33 (FIG. 2) of the pawl 27 extends at substantially a right angle to the leg 31 toward the star gear 23 and includes an unstanding stud 34.

The releasing member 28 (FIG. 2) is mounted on top of and frictionally engaged, as by a lock washer (not shown) compressed therebetween by the pin 29, with the pawl 27. The member 28 has a flat portion 36 spaced above and extended parallel with the base 18, and has an upstanding front edge 37 turned upwardly and at a right angle from the flat portion 36. A slot 38 is formed in the portion 36 and has the pawl leg stud 34 extended through it. The slot 38 is of a length so that the stud 34 can be reciprocaly moved therein during the complete movement of the pawl 27, thus allowing a lost motion between the pawl 27 and the first releasing member 28.

These two parts 27 and 28 are biased together and in the same direction, by a coil spring 39 secured at one end to the pivot pin 29 and curved at the other end 41 (FIG. 2) about the stud 34. By this arrangement, and as indicated in solid lines in FIG. 2, the spring 39 biases the stud 34 and thus the pawl 27 in a counterclockwise manner, whereby one corner 42 of the pawl is engageable with the teeth 24 of the inner star gear 23. This position of the pawl 27, where the teeth of the star gear 23 are engaged, prevents the star gear from rotating in a clockwise manner (FIG. 2), which rotation occurs when a door 11 is opened, due to the leg 31 of the pawl contacting the left end 40 (FIG. 5) of the slot 32. Thus, as the pawl 27 is prevented against further movement in a counterclockwise direction, the star gear 23 cannot rotate further in a clockwise direction.

To close a door 11, the star gear 23 is rotated counterclockwise (FIG. 2), and this rotation may occur due to the capability of the teeth 24 contacting and moving the pawl 27 clockwise against the bias of the spring 39. As soon as the rotation of the star gear 23 is completed, whereupon the door 11 is closed, the bias of the spring 39 will return the pawl 27 to its normal star gear engaging position.

The first releasing member 28 is connected by the usual linkage (not shown) to an outer door handle 43 (FIG. 1) for each door 11 and is operable by a clockwise movement (see the dotted line position of FIG. 2) to force the pawl 27 also in a clockwise direction and thus to disengage the corner 42 from the star gear teeth 24. This action as to the pawl 27 is accomplished by the part 44 of the flat portion 36 at the upper end (FIG. 2) of the slot 38 forcing the pawl 27 by means of contacting the stud 34. As will be seen hereinafter, were the first releasing member 28 held against such clockwise movement or held in the solid line position of FIG. 2, the door 11 could still be closed, as the required counterclockwise rotation of the star gear 23, and the resulting clockwise movement of the pawl 27 could be accomplished without movement of the member 28, due to the lost motion movement of the stud 34 within the slot 38 of the member 28.

A second releasing member 46 (FIG. 5) for an inner door handle (not shown) is of a flat nature and is pivotally mounted by a pivot pin 47 to the side 19 whereby one end is provided with a mechanism 48 adapted for connection to the inner door linkage (not shown), and whereas the other end of the member 46 is of a forked nature. One portion 49 (FIG. 5) extends adjacent the left side of the pawl leg 31 and the other portion 51 is turned outwardly at a right angle from the side 19 for a purpose to appear hereinafter.

Figure 2:
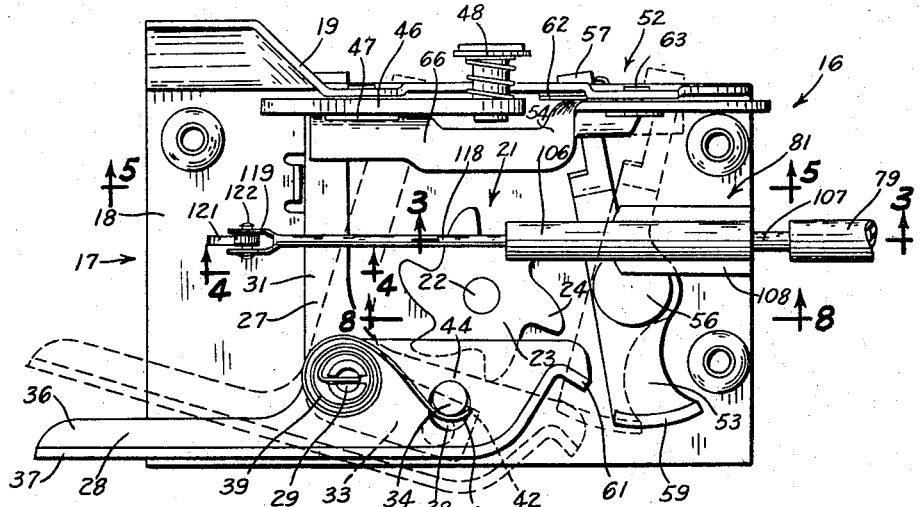
FIG. 2 is an enlarged plan view of a latch mechanism for one of the automobile doors to which one embodiment of the invention is attached, and showing certain parts in alternate positions.
Figure 5:
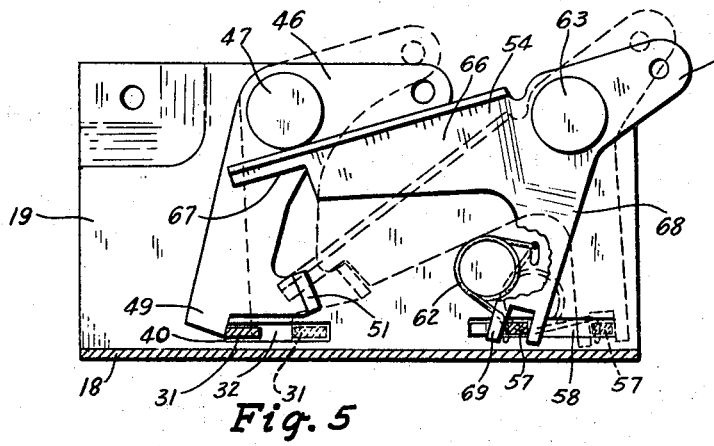
FIG. 5 is a cross-sectional view taken along the line 4—4 in FIG. 2, and showing the side of the door latch with certain parts in alternate positions.

By rotational movement of the second releasing member 46 in a counterclockwise manner from a normal inoperative position, as shown in full lines in FIG. 5, to an operative position, as shown in dotted lines in FIG. 5 the portion 49 will contact the pawl leg 31 and force it to the right as viewed. Viewing FIG. 2, it is clear that this movement of the pawl leg 31 to the right or clockwise, in turn forces the pawl 27 and the member 28 clockwise as a unit and against the bias of the coil spring 39, thus effecting a release of the star gear 23 from the pawl 27. Upon a release of the second releasing member 46, the bias of the spring 39 forces the stud 34, the first releasing member 28, the pawl 27, and through the pawl leg 31, the second releasing member 46 back to their normal positions (FIGS. 2 and 5).

A mechanism for locking each door 11 from the inside, commonly called a "baby lock," comprises a safety mechanism 52 which includes a base lever 53 (FIG. 2) interconnected to a side lever 54 (FIG. 5) for simultaneously blocking the paths of movement of the first and second releasing members 28 and 46, respectively, out of their normal inoperative positions. By so doing, the members 28 and 46 are rendered ineffective to open the door 11.

The base lever 53 (FIG. 2) is rotatably mounted on the base 18 by a pivot pin 56 and has one end 57 inserted for reciprocal movement in a slot 58 (FIG. 5) formed therefor in the side 19, and which slot limits the movement of the lever 53. The other end 59 of the lever 53 is upstanding and curved in a manner complementary to the adjacent end 61 of the edge 37 for the first releasing member 28. The lever 53 is biased to quickly assume either one of two positions (FIG. 2) by means of a spring 62 (FIG. 5) having one end connected to the side 19 and the other end connected to the lever end 57.

The side lever 54 (FIG. 5) is triangular in shape, being rotatably mounted to the side 19 by a pivot pin 63, and includes one leg 64 adapted for attachment to the conventional linkage for the safety mechanism 52, a second leg 66 extends across the side 19 and with a notch 67 formed at its end, and a third leg 68 forked in the manner of a yoke 69 to straddle the end 57 of the base lever 53.

The safety mechanism 52 is thus movable from one position where the base lever 53 and the side lever 54 (see the solid line positions of the levers 53 and 54 in FIGS. 2 and 5, respectively) are inoperative, to another position where the base lever 53 (see the dotted line position in FIG. 2) is blocking via its end 59 clockwise movement of the first releasing member 28; and where the side lever 54 (see the dotted line position in FIG. 5) is blocking by means of the notch 67 positioned in front of the portion 51 counterclockwise movement of the second releasing member 46. When the releasing members 28 and 46 are thusly blocked, they are rendered ineffective to disengage the pawl 27 from the star gear 23.

For the purpose of rendering the releasing members 28 and 46 ineffective to release the pawl 27 from its engagement with the star gear 23, and for the purpose of providing an arrangement whereby to supplant the safety mechanism 52 so that the doors 11 cannot be opened when the engine 12 is running, and also after the engine 12 has stopped, a remotely controlled locking assembly 71 is provided.

Figure 6:
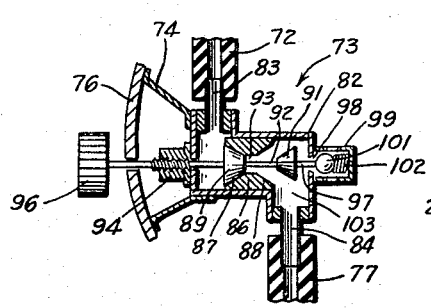
FIG. 6 is an enlarged cross-sectional view of the valve structure for the attachment, located at the dashboard for the operator.

The unit 71 is complete within itself and comprises a fluid transmitting line 72 (FIG. 1) for connection to the diaphragm assembly 14, a valve 73 (FIGS. 1 and 6) for connection to the line 72 and mounted by a bracket 74 to the dashboard 76, another line 77 for connection to the valve 73, a pair of lines 78 and 79 leading from the line 77, and a locking unit 81 (FIG. 2) for attachment to each latch 16.

The valve 73 (FIG. 6) is a three-positive valve and includes a housing 82 provided with a sealed inlet tube 83 for connection with the inlet line 72, and a sealed outlet tube 84 for connection with the outlet line 77. A valve seat member 86 is mounted in the housing 82 and has oppositely facing seats 87 and 88 of the tapered type which are adapted to receive oppositely facing valve plugs 89 and 91 mounted on a valve stem 92 inserted axially through the passage 93 of the valve seat member 86.

One end of the stem 92 is threadingly inserted through an internally threaded cap 94 mounted on the housing 82 and is provided with a knob 96 on the operator's side of the dashboard 76. The other end 97 of the stem 92 is inserted through an opening 98 formed in the housing 82, and which leads to a bleed or vent cup 99 secured to the housing over the opening 98. The vent cup is open to the the atmosphere and has a ball valve 101 mounted on a spring 102 therein which tends to force the ball 101 to seat over the opening 98 and close off the interior 103 of the housing 82 from the atmosphere.

The locking unit 81 (FIG. 2) is a small, compact structure attachable directly to the base 18 of the case 17 and is structurally located well within the confines of the base 18 and the side 19, as extended laterally of the base 18. The unit 81 includes a cylinder 106 (FIGS. 2, 3 and 8) having a tube 107 at one end for connection to the fluid transmission line 79, and which is mounted on a bracket 108 (FIG. 8) secured to the latch base 18.

A piston 109 is reciprocally mounted within the cylinder 106 and has a stem 111 extended inwardly with a valve portion 112 at its end for complementary seating in a valve seat 113. A spring 114 extends between the piston 109 and the seat 113 to bias the portion 112 away from the seat. When the portion 112 is not seated, the interior 116 of the cylinder 106 is open to the tube 107 via a passage 117. From the side of the piston 109 opposite the stem 111, a piston rod 118 extends outwardly through the cylinder and across the base 18 (FIG. 2) to a forked end 119.

Figure 7:
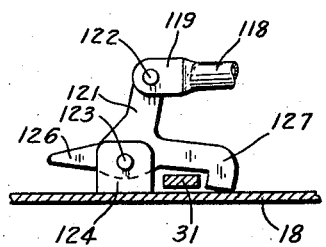
FIG. 7 is a cross-sectional view similar to FIG. 4 and wherein the attachment parts in side elevation are shown in alternate positions.

A lock lug 121 is pivotally attached to the forked end 119 by a pivot pin 122 and is also pivotally attached by another pin 123 to a support 124 mounted on the base 18. The lock lug 121 has one leg 126 adapted to contact the base 18 and act as a stop for this movement of the piston rod 118 outwardly or to the left as viewed (FIGS. 2 and 4), and has the opposite leg 127 shaped in the manner of a hook. When the hook leg 127 is positioned about the pawl leg 31 as viewed in FIG. 7, the leg 31 cannot move or be moved by either of the releasing members 28 or 46. Thus, the pawl 27 is positively held in place and prevented from moving to disengage its corner 42 from engagement with the star gear teeth 24.

In the operation of the remotely controlled locking assembly 71, it is to be remembered that the normal position for the pawl 27 is in the solid line position of FIGS. 2 and 5 where it is engaged with so as to prevent the star gear 23 from being rotated clockwise (FIG. 2) to open a door 11.

Figure 3:
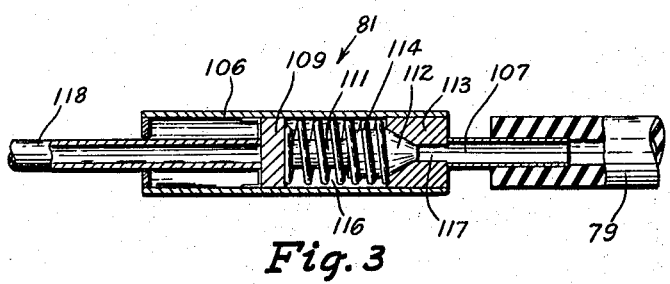
FIG. 3 is an enlarged, fragmentary, cross-sectional view taken along the line 3—3 in FIG. 2.

Assuming the automobile 10 is being operated so that the engine 12 is running, a steady vacuum pull is created by the diaphragm assembly 14 and applied through the line 72 to the valve 73. As the normal position for the valve 73 is one where the knob 96 is turned to an indicia (not shown), for example on the dashboard 76, so that the plug 89 is tightly fitted in its seat 87, and whereby the stem end 97 forces the ball 101 away from the opening 98, the vacuum pull of the diaphragm assembly 14 is stopped at the plug 89 and atmospheric pressure is vented into the lines 77-79 to the interior 116 (FIG. 3) of each cylinder 106. Thus, with the valve 73 in a first normal position, the piston 108 is biased to the left of its position as shown in FIG. 3, with the valve portion 112 being unseated; and whereby the lock lug 121 is pivoted counter-clockwise (FIG. 4) until the stop leg 126 contacts the base 18 and the hook leg 127 is raised above the base sufficient to allow movement of the pawl leg 31 parallel to and across the face of the base 18. In this first position of the assembly 71, the latch 16 is entirely unaffected.

Assuming the engine 12 is still running, by turning the knob 96 (FIG. 6) to a second indicia (not shown), whereby the stem 92 is moved to the left as viewed, the plug 89 is unseated and the stem end 97 is backed away from the ball valve 101, permitting the spring 102 to seat the ball and close the opening 98. As this operation does not seat the other plug 91, the interior 103 of the housing 82 and thus the outlet line 77 are open to the vacuum source through the line 72 and the valve passage 93. The vacuum is then applied through the lines 78 and 79 to each cylinder 106.

The vacuum applied to the interior 116 of a cylinder 106 is of a sufficient amount that the piston 109 is pulled to the right (FIG. 3) and against pressure of the spring 114 so as to tightly seat the valve portion 112 in its seat 113. This movement of the piston 109 pulls the rod 118 inwardly of the cylinder 106 or to the right (FIG. 3) and pivots the lock lug 121 (FIG. 7) in a clockwise manner so that the hook end 127 is placed closely adjacent and in the path of the pawl leg 31. In this second position of the valve 73, the lock lug 121 is therefore positively blocking and holding the pawl 27 against movement by either releasing member 28 and 46 to release the star gear 23.

Figure 4:
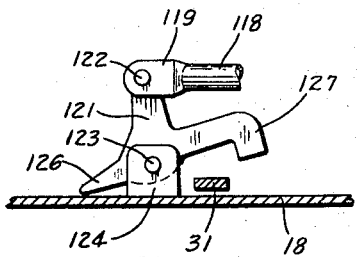
FIG. 4 is a fragmentary, cross-sectional view taken along the line 4—4 in FIG. 2, and showing part of the attachment in side elevation and in one position.

Should it be desirable, while the engine is running, to release the lock lug 121 to its FIG. 4 position, so that the pawl 27 is operable to release the star gear 23 to open the door 11, the knob 96 is merely threaded inwardly again to its first position. This movement of the stem 92 re-seats the plug 89 and opens the ball valve 101, thus stopping the application of vacuum through the passage 93 and venting the line 77 and the cylinder interior 116 to the atmosphere. The spring 114 then acts to break the seal of the valve portion 112 in its seat 113, and move the stem 111, the piston 109, and the rod 118 to the left as viewed (FIG. 3), so as to rotate the lock lug 121 counter-clockwise (FIG. 4) to an unlocking position.

Should, however, instead of releasing the locking unit 81 (FIG. 2), it is desirable to maintain the unit in the hereinbefore described pawl-locking position when the engine has stopped running, the knob 96 (FIG. 6) is again turned to a third indicia (not shown). By this rotation of the knob, the stem is moved further to the left, as viewed in FIG. 6, until the passage 93 is closed by the other plug 91. Noting that during this operation, the ball valve 101 has remained closed, the result is to close off the line 77 from the source of suction pressure while trapping the vacuum already in the lines 77-79 between the valve 73 and each cylinder 106 at the valve portion 112. Thus, when the valve 73 is placed in a third position while the engine is running, when the engine is subsequently stopped, the locking unit 81 will remain locked and effective to prevent the release of the star gear 23 by the pawl 27 until the valve 73 is turned back to its first, normal position.

In summation, this invention comprises a compact unit adapted for attachment to a door latch and within its dimensional confines, which when connected through a valve of the type described to a source of suction of the engine, is capable of positively locking the latch against operation thereof by either releasing mechanism to unlock the door, when the engine is running at any speed and also after the engine has stopped running.

Although one embodiment of the invention has been disclosed herein, it is to be remembered that various mod-

I claim:

1. In an automobile with an engine having a source of vacuum pressure associated with said engine, a door having a latch mounted substantially within the confines of a supporting case structure, said latch including bolt means movable to permit said door to open, a pivoted pawl member movable to a position to lockingly engage said bolt means to prevent said door from opening, biasing means for urging said pawl member into said position, latch means releasably locking said pawl in bolt locking engagement, releasing means operable to move said pawl member out of said locking position to permit the opening of said door, inside and outside door handles mounted on said door and operably connected to said releasing means, locking means for preventing said pawl member from moving from said locking engagement with said bolt means said locking means rendering ineffective the releasing operation of said latch means and including, a fluid transmission line connected at one end to said source of vacuum pressure, said locking means comprising a locking lug pivotally mounted upon said case structure and movable into positive locking contact with said pawl member and preventing movement of said pawl, a reciprocal unit connected at the other end of said fluid transmission line and mounted within the confines of said case structure for moving said locking lug into operative engagement with said pawl member, said reciprocal unit including a pair of elements relatively movable to effect a fluid tight seal upon the application of a vacuum thereto, whereby said locking lug connected to one of said elements, is moved into engagement with said pawl member, and a manually operated valve unit interposed in said fluid transmission line, said valve unit constructed to assume a first position where atmospheric pressure is applied to one of said elements, a second position where the atmospheric pressure is sealed off and vacuum applied, and a third position where the atmospheric pressure is sealed off and where vacuum is trapped between one of said elements and said valve unit, whereby said reciprocal unit is operable by said valve unit in said second position to cause said locking lug to prevent said pawl member from moving when the engine is running, and by said valve unit in said third position to cause said locking lug to prevent said pawl member from moving when said engine has stopped running.

References Cited

UNITED STATES PATENTS

| | | | |
|---|---|---|---|
| 2,167,675 | 8/1939 | Palmer | 180—82 |
| 2,629,453 | 2/1953 | Craig | 180—82 |
| 2,716,568 | 8/1955 | Daview. | |
| 2,948,561 | 8/1960 | Eatinger. | |
| 3,096,845 | 7/1963 | Oishei et al. | 180—82 |
| 3,141,517 | 7/1964 | Detloff et al. | 180—82 |
| 3,168,931 | 2/1965 | Oishei | 180—82 |

KENNETH H. BETTS, *Primary Examiner.*